US008229930B2

(12) United States Patent
Cohen et al.

(10) Patent No.: US 8,229,930 B2

(45) Date of Patent: Jul. 24, 2012

(54) URL REPUTATION SYSTEM

(75) Inventors: Jason Cohen, Woodinville, WA (US); Benjamin Arai, Bellevue, WA (US); Craig Boucher, Bellevue, WA (US); Nicholas Waggoner, Newcastle, WA (US); Jose Marcos de Oliveira, Redmond, WA (US); Yun Lin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/697,306

(22) Filed: Feb. 1, 2010

(65) Prior Publication Data

US 2011/0191342 A1 Aug. 4, 2011

(51) Int. Cl.
*G06F 7/00* (2006.01)
*G06F 17/30* (2006.01)

(52) U.S. Cl. ......................... 707/737; 707/752; 713/165

(58) Field of Classification Search .................. 707/781, 707/737; 709/207; 713/165; 726/26
See application file for complete search history.

(56) References Cited

U.S. PATENT DOCUMENTS

| | | | | |
|---|---|---|---|---|
| 7,093,200 | B2 * | 8/2006 | Schreiber et al. | 715/835 |
| 7,562,304 | B2 | 7/2009 | Dixon et al. | |
| 7,640,590 | B1 | 12/2009 | McCorkendale et al. | |
| 2005/0015626 | A1 * | 1/2005 | Chasin | 713/201 |
| 2006/0253458 | A1 | 11/2006 | Dixon et al. | |
| 2007/0130350 | A1 | 6/2007 | Alperovitch et al. | |
| 2008/0034073 | A1 * | 2/2008 | McCloy et al. | 709/223 |
| 2008/0082662 | A1 | 4/2008 | Dandliker et al. | |
| 2008/0133540 | A1 * | 6/2008 | Hubbard et al. | 707/10 |
| 2008/0175266 | A1 | 7/2008 | Alperovitch et al. | |
| 2008/0303689 | A1 | 12/2008 | Iverson | |
| 2009/0006569 | A1 * | 1/2009 | Morss et al. | 709/206 |
| 2010/0042931 | A1 * | 2/2010 | Dixon et al. | 715/738 |
| 2010/0306250 | A1 * | 12/2010 | Mizunashi | 707/769 |

OTHER PUBLICATIONS

"International search report", Mailed Date: Sep. 2011, Application No. PCT/US2011/023372 , Filed Date: Feb. 1, 2011, pp. 9.

Wells, Jefferson, "Microsoft Phishing Filter Feature in InternetExplorer 7 and MSN ToolbarPrivacy Audit Report", Retrieved at << http://www.jeffersonwells.com/DefaultFilePile/ClientAuditReportsMicrosoft__PF__IE7__IEToolbarAddin__Privacy__Audit.pdf >>, May 1, 2006, pp. 1-9.

"Cisco Iron Port Web Reputation Technology: Protecting Against URL Based Threats", Retrieved at << http://www.ironport.com/technology/ironport__web__reputation.html >>, 1992-2009, pp. 1-4.

"BrightCloud Software Development Kit Overview", Retrieved at << http://www.brightcloud.com/sdk.asp >>, 2008, pp. 4.

"A Caching Solution for Web 2.0: SecureCache", Retrieved at <<http://www.arrowecs.fi/files/dns__fi/Webwasher/Security__Cache__ WP.pdf >>, White Paper at www.securecomputing.com, Retrieved Date: Oct. 22, 2009, pp. 1-4.

* cited by examiner

*Primary Examiner* — Cam Truong

(74) *Attorney, Agent, or Firm* — Russell S. Krajec; Krajec Patent Offices, LLC

(57) ABSTRACT

A URL reputation system may have a reputation server and a client device with a cache of reputation information. A URL reputation query from the client to the server may return reputation data along with probabilistic set membership information for several variants of the requested URL. The client may use the probabilistic set membership information to determine if the reputation server has additional information for another related URL as well as whether the classifications are inheritable from one of the variants. If the probabilistic set membership determines that the reputation server may have additional information, a query may be made to the reputation server, otherwise the reputation may be inferred from the data stored in the cache.

17 Claims, 5 Drawing Sheets

URL REPUTATION SYSTEM

BACKGROUND

Websites and other network resources may have various threats associated with them. For example, some websites may have malware, adware, viruses, or other noxious components that may infect a computer system. Other network resources may have pornography, advertisements, or other information that may not be suitable for a particular network, such as a home network or a business network.

The content classification of the websites may be known as the site's reputation. The reputation may include classifications that may be used to block access in some situations, such as pornography or gambling sites. Other reputations may have good reputations that may enable secure connections or trusted operations to be performed.

In some cases, a website may have multiple characteristics or classifications. For example, a website that has social network content may have some pages that contain unwanted content while other pages may have desirable content. Another website may have a portion of the domain dedicated to explicit content while other portions of the website may be free of such content.

SUMMARY

A URL reputation system may have a reputation server and a client device with a cache of reputation information. A URL reputation query from the client to the server may return reputation data along with probabilistic set membership information for several variants of the requested URL. The client may use the probabilistic set membership information to determine if the reputation server has additional information for another related URL as well as whether the classifications are inheritable from one of the variants. If the probabilistic set membership determines that the reputation server may have additional information, a query may be made to the reputation server, otherwise the reputation may be inferred from the data stored in the cache.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
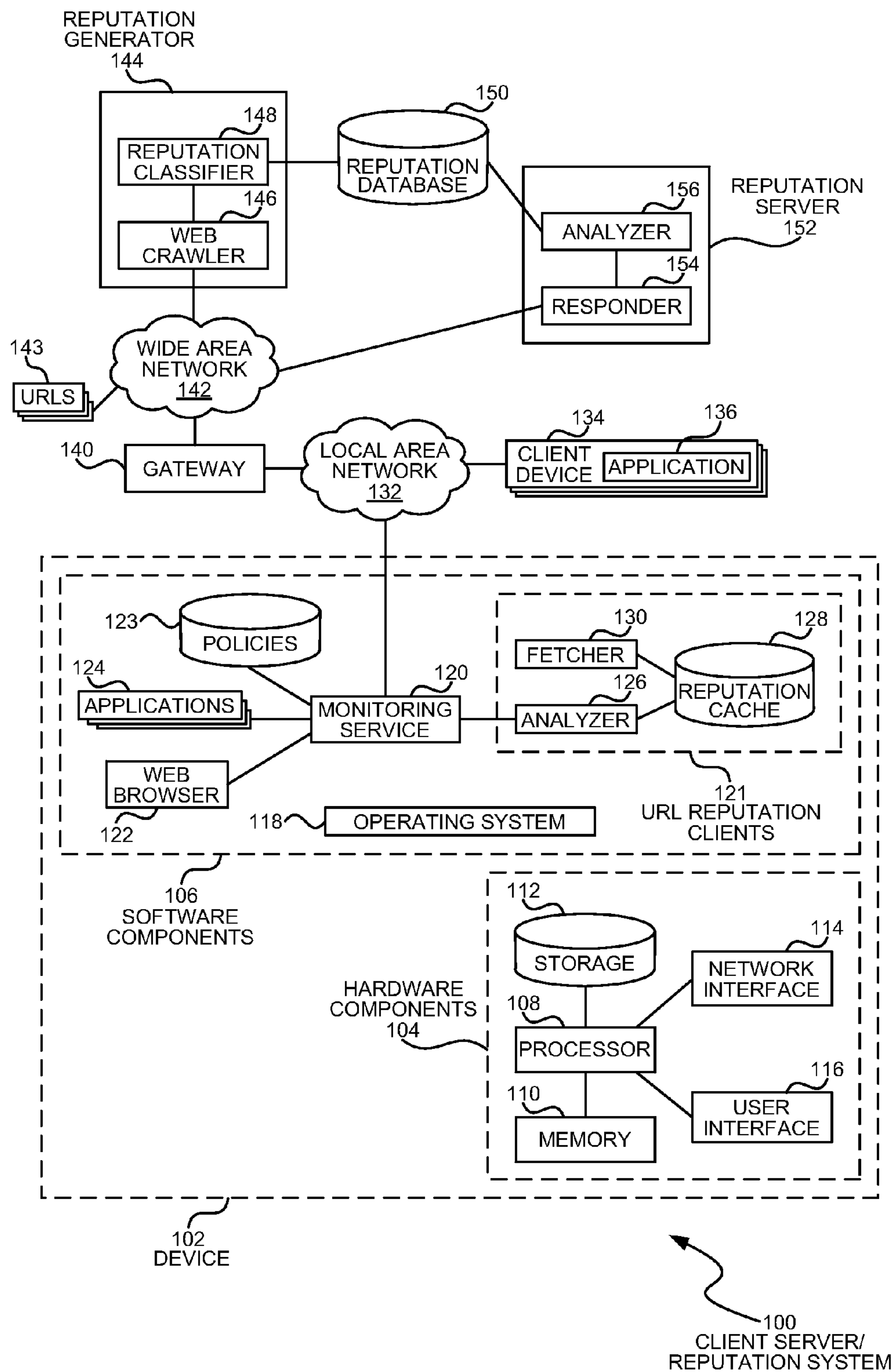
FIG. 1 is a diagram illustration of an embodiment showing a network environment in which a client/server reputation system may operate.

A URL reputation system may use probabilistic set membership mechanisms to build a sparsely populated database on a client device. The database may be used to determine a URL reputation or to determine if a reputation server has additional information about a specific URL.

The URL reputation system may transfer data to the client device so that the client device may be able to determine if another query to the reputation server may be beneficial. If the query will not be beneficial, the client device may use the data already received to determine a URL reputation.

A probabilistic set membership algorithm may be used to identify URLs for which the reputation server may have information. The reputation server may send a probabilistic set membership key and inheritance attributes for different URL variants so that the client may determine if another query will yield beneficial results and how to determine a reputation when the reputation server does not have additional information.

The URL reputation system may minimize queries to the reputation server by a client device. In some cases, the probabilistic set membership algorithm may indicate that the reputation server has data when, in fact, it does not. This may lead to some queries that return no result. However, the probabilistic set membership algorithm will generally not result in indicating that the reputation server does not have information when, in fact, it does. This design may ensure that the client device produces accurate results with the data available on the reputation server.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and maybe accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system for URL reputations. Embodiment 100 is a simplified example of a system that may use a reputation cache database that contains probabilistic set membership indicators and inheritance attributes for various URLs, which may minimize calls to a reputation server.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a client and server system that may provide URL reputation services. The server may maintain a large database of URL reputations, and the client may request reputations for specific URLs. The client may maintain a cached reputation database that may include information from which the client may determine if the server has information about a specific URL.

A URL reputation service may determine a classification for a given URL. The classification may be used by an application to treat specific URLs in certain manners or other functions. In a simple example, a URL reputation service may be used to classify web pages that may be requested by a browser application. A set of policies may permit or deny access to certain URLs based on the URL classification. The set of policies may be defined by a network administrator. For example, a URL with a pornographic classification may be denied access, while a URL with a shopping classification may be permitted access.

URL reputation services may have many different use scenarios. A URL reputation service may be used as part of a firewall or gateway device to permit or deny access to certain URLs inside a controlled environment, such as a home or business network, or as part of a content monitoring system for a desktop computer, for example. The firewall or gateway may monitor URLs for malware, unwanted content, phishing website, or other inappropriate content. Another use scenario may be to track or monitor Internet access for individual applications or users. Still another use scenario may be to allow different levels of access to URLs. For example, some trusted sites may be permitted authenticated connections with a low level of restrictions while other nefarious sites may be permitted connections with high level of restrictions.

The URL reputation services may be used by different applications in many different manners. In some embodiments, a URL reputation client may provide services for those applications. For example, a URL reputation client may operate on a user's desktop computer and provide URL reputation services that may be integrated with a firewall application, a web browser, or other application. In another example, a server in a local area network may provide URL reputation services for various client devices in the local area network. In such an example, the local area network server may act as a URL reputation client to a URL reputation server that may be located on the Internet.

The server may transmit probabilistic set membership information along with the URL classification. The probabilistic set membership information may be used by the client to determine if the server has information about specific URLs. When searching for information on a specific URL from a cached reputation database, the client may evaluate the probabilistic set membership information to determine whether or not the server has information on the specific URL. If so, the client may request the information from the server. If not, the client may infer a URL classification by determining which properties are inherited from other URLs classified in the cached database.

The cached database with probabilistic set membership information may minimize queries to the server, allowing the server to provide services for many more clients. Such a system may enable URL reputation services to be provided at a lower cost and may enable URL reputation services to be used in a wide variety of applications.

The cached database may be an efficient mechanism to store URL reputation data, as a very small amount of data may be stored to represent a very large body of knowledge. Many classifications for URLs may be inherited based on URL path or host, and if a reputation server does not contain data for a specific URL, the classifications may be inherited to a specific URL from other related URLs.

The probabilistic set membership mechanism may be a Bloom filter or other similar mechanism. A Bloom filter can be formed by taking one or more hashes of a value and representing those hashes as bits in a Bloom array. Each member of a value set may be similarly hashed and added to the Bloom array. In order to determine if a value is represented in the Bloom array, the value may be hashed and compared to the Bloom array. If the Bloom array contains the hashed value, the value is possibly contained in the set. If the Bloom array does not contain the hashed value, the value is not contained in the set. The Bloom array may be considered one probabilistic set membership key used by a reputation client.

A Bloom filter may be used to represent URLs in a URL database by hashing each URL in a set of URLs and creating a Bloom array from the results. The Bloom array may represent a set of URLs, and may be used by a client to determine if a specific URL may be present in the set.

A Bloom filter is one probabilistic set membership mechanism that may be used for a URL reputation database. Other embodiments may use different probabilistic set membership mechanisms. In general, the probabilistic set membership mechanism may operate by a server providing a probabilistic set membership key for one or more nodes of a URL tree. The client may evaluate the probabilistic set membership keys to determine if a URL may be available on the server, and may use this determination to query the server.

In many embodiments, the probabilistic set membership mechanism may result in false positive results, but not false negative results. A false positive result may be a finding that a URL is present in the set of URLs when, in fact, the URL is not present. A false negative result may be a finding that a URL is not present when, in fact, the URL is present.

Many URL reputation services may have multiple classifications of URLs. In some cases, ten, twenty, or even more classifications may be defined for URLs. The classifications may be any type of classification and may include various degrees of a class. For example, a system may be configured to have a pornography classification and may further define pornography with different sub classifications, such as soft pornography, hard pornography, etc. Each embodiment may have a different classification scheme.

Many URL reputation services may have multiple classifications or categories for a given URL. For example, a single URL may be classified as pornography, phishing, malware, and a host of other classifications.

The device 102 may provide a monitoring service that operates as a URL reputation client. The device 102 may have various hardware components 104 and software components 106, and may represent a conventional computing device. In some embodiments, the device 102 may be a server computer, desktop computer, game console, network appliance, or other similar device. In other embodiments, the device 102 may be a portable computing device such as a laptop computer, netbook computer, personal digital assistant, cellular telephone, or other such device.

The architecture of device 102 may represent a typical computing device, although other devices may have different components and may implement some components differently. For example, some devices may implement some hardware components as software components and vice versa.

The hardware components 104 may include a processor 108 which may connect with random access memory 110 and nonvolatile storage 112. The hardware components 104 may also include a network interface 114 and a user interface 116.

The software components 106 may include an operating system 118 on which several applications and services may execute. A monitoring service 120 may intercept various URL requests from a web browser 122 or various applications 124, and may apply various policies 123 based on input from a URL reputation client 121. The monitoring service 120 may permit or deny access to the URLs based on the policies 123. In some cases, the web browser 122 or applications 124 may handle the URLs in different manners based on the URL reputation supplied by the monitoring service 120.

The configuration of device 102 is merely one implementation of a URL reputation system.

The URL reputation client 121 may have an analyzer 126 that may analyze a reputation cache 128 to determine or infer classification information from the reputation cache 128 or if the reputation information may be available from a reputation server. A fetcher 130 may communicate with a reputation server to retrieve the reputation information and populate the reputation cache 128.

The URL reputation client 121 may operate by fetching URL reputation information as the URLs are requested. In some embodiments, such a mechanism may populate the reputation cache 128 over time. Initially, such an embodiment may use many queries to a reputation server to build the database, but the frequency of queries may diminish as the reputation cache 128 is populated.

In some embodiments, a reputation cache 128 may be populated initially by downloading URL reputation data for popular URLs that are likely to be queried. The downloaded URL reputation data may populate the reputation cache 128. Such embodiments may be useful to avoid a high frequency of queries during a startup phase of the URL reputation client.

The device 102 may be connected to a local area network 132.

In some embodiments, the device 102 may operate as a URL reputation service within the local area network 132. In such an embodiment, the device 102 may receive requests from client devices 134 or the device 102 itself, and the requests may have applications 136 that may use the output of a URL reputation service. Such an embodiment may provide a single device that maintains a reputation cache 128 that may be shared by multiple client devices 134, and may minimize requests to a reputation server.

The local area network 132 may be connected through a gateway 140 to a wide area network 142, which may be the Internet. The wide area network 142 may have many URLs 143 that may be classified.

A reputation generator 144 may determine URL reputations and populate a reputation database 150. The reputation generator 144 may include a web crawler 146 and a reputation classifier 148. The web crawler 146 may crawl the wide area network 142 to locate URLs 143, and the reputation classifier 148 may determine a classification for the URLs 143 and store the classification in the reputation database 150. The reputation classifier 148 may be an automated process that analyzes a URL for certain content, configuration, or other characteristics. In some embodiments, a human input may be incorporated into the reputation classifier 148 to determine one or more classifications for a URL or set of URLs.

A reputation server 152 may respond to requests from a URL reputation client 121 by accessing the reputation database 150 and transmitting a response. The response may include URL classifications as well as probabilistic set membership information.

The reputation server 152 may have a responder 154 that may receive requests from a URL reputation client 121 and transmit responses. The analyzer 156 may query the reputation database 150 and may generate the probabilistic set membership information that may be transmitted to the URL reputation client 121.

Figure 2:
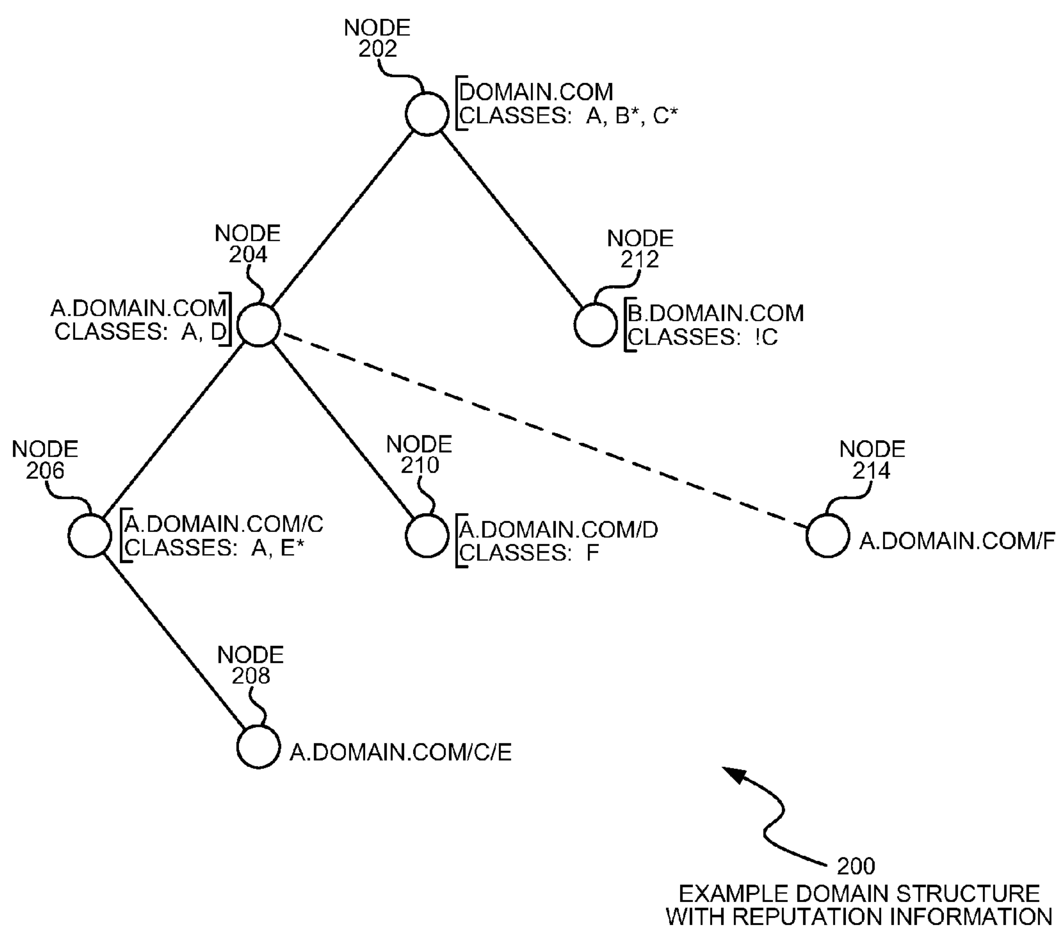
FIG. 2 is a diagram illustration of an example embodiment of a domain hierarchy with classifications.

FIG. 2 is a diagram of an embodiment 200, showing a domain tree for different URLs. Embodiment 200 is a simplified example of a domain tree for which different classifications may be assigned where some of the classifications may be inheritable.

Embodiment 200 may represent a simple domain that has several nodes. The top level node 202 may represent a URL of "domain.com". The remaining nodes may be host and path variants of the top level node.

The term Uniform Resource Locator or URL is used in this specification and claims to refer to an address or identifier for a resource. In many uses, the URL contains both an address as well as a means for acting on the resource. For example, the URL "http://domain.com" may indicate the address of "domain.com" as well as the method for acting on the address of "http://". Some embodiments may use a Uniform Resource Identifier (URI), which may be a more generic manner for identifying a resource, while other embodiments may use a Uniform Resource Name (URN).

For the purposes of this specification and claims the terms URL, URN, and URI are used interchangeably and any of the terms are considered to represent any of the other terms.

The node 202 is the top level node "domain.com" and is illustrated has having classifications of A, B*, and C*. The notation "B*" indicates that B is inheritable, while the lack of a star for classification A indicates that A is not inheritable.

The node 204 is a second level node "a.domain.com" and is illustrated as having classifications A and D. Because the classes B and C are illustrated as inheritable, the node 204 may have a full classification of A, B, C, and D. The definition of classifications A and D at node 204 illustrate a method of class definitions where inherited classes are defined at the highest level of their definition and are inherited down to child nodes. Other embodiments may include inherited classifications in each node definition.

The node 204 is an example of a child host. The "a.domain.com" address may represent a child host from "domain.com".

Node 206 illustrates a node that is a child path of node 204, and has an address of "a.domain.com/c", where the "/c" represents a path from the host "a.domain.com". Node 206 is illustrated as having classifications A and E*. Because node 206 is a child of node 202 with inheritable classes B* and C*, the classes B and C would be attributed to node 206 by inheritance.

Node 208 illustrates a node that is a child path of node 206, and has an address of "a.domain.com/c/e". Node 208 is illustrated as having no classifications, but the inheritable classifications of B, C, and E may apply to node 208

Similarly, node 210 illustrates a child path of node 204, and has an address of "a.domain.com/d". Node 210 is illustrated as having a classification of F, and would inherit classifications B and C from node 202. The parent node 204 is classified as A and D, but because A and D are not inheritable, the A and D classifications may not pass down to node 210.

Node 212 illustrates a second host under the node 202, and has an address of "b.domain.com".

In many URL naming schemes, a URL may have host variants and path variants. An example of a host variant may be "a.domain.com" and "b.domain.com", where the hosts are "a" and "b", respectively. An example of a path variant may be "a.domain.com/a" and "a.domain.com/b". In this example, the same host "a.domain.com" has two URLs that are different paths from the host as "/a" and "/b".

Many URLs may have complex path variants. In some cases, the paths may have a complex syntax that may include parameters passed to the URL. For example, a URL "a.domain.com/a/for m=big&index=24" may pass the parameters "form" and "index" with values "big" and "24", respectively.

Node 212 is illustrated as having a classification of "!C", which may indicate that the classification C is not applied to node 212. The notation "!C" is an example of a notation that may limit the inheritance of a classification. In embodiment 200, the classification C may pass down from node 202 to the nodes of a.domain.com, but not pass down for nodes at b.domain.com.

The node 214 is illustrated as a child path of node 204 with an address of "a.domain.com/f". Node 214 may be illustrated as having no classifications, and may inherit the classifications B and C from node 202.

The operations of a URL reputation client may involve collecting various pieces of the structure of embodiment 200 when a request for a URL reputation is received.

For example, a request may be made for the reputation of node 208 and a URL reputation client may receive a URL of "a.domain.com/c/e". The URL reputation client may attempt to lookup the URL "a.domain.com/c/e" in the cached reputation database but may not locate the URL.

The URL reputation client may identify multiple variants of the requested URL. In the example, the variants may include "domain.com", "a.domain.com", "a.domain.com/c", "domain.com/c", "domain.com/c/e", as well as the requested URL "a.domain.com/e/e". If none of the URLs are present in the cached reputation database, the reputation client may pass all of the URLs to the reputation server to receive classes and probabilistic set membership keys for each URL. The information received may be information for nodes 202, 204, and 206.

In the example, the reputation server may not have information about the URLs "domain.com/c" and "domain.com/c/e" because such URLs may not exist. The reputation server also may not have information about the URL "a.domain.com/c/e" because the URL may not have classification information that cannot be determined by inheritance.

In some embodiments, a reputation client may create the variants for a URL and may transmit all variants to the reputation server. In other embodiments, the client may transmit a single URL and the reputation server may create the variants and transmit classification and probabilistic set membership information for each variant to the reputation client.

Embodiments like the one described in the example may provide classification information only when the URL has a classification that is different from the parent or when the inheritance chain of classification changes between URLs. In such embodiments, a domain may have many thousands of child URLs but when those child URLs all share the same classification as the top level URL, a single classification definition for the top level URL may be inherited to all the lower level URLs. Such an embodiment may be more efficient than storing the same classification for each of the many child URLs. Other embodiments, however, may provide redundant or duplicative classifications for each child URL.

In some embodiments, certain classifications may inherit through paths but not domains, while other classifications may inherit through domains but not paths. For example, a URL of "explicit.domain.com" may have a pornography classification that may be inherited to all members of "explicit.domain.com" but not "safe.domain.com". In another example, a URL of "domain.com/explicit" may have a pornography classification that may be inherited through the path "/explicit" but not through other hosts under "domain.com".

A probabilistic set membership key may be provided by a reputation server for each node to which a response is made. Each probabilistic set membership key may be used to determine if a URL may be a member of the set represented by the key. For example, the node 204 may have a probabilistic set membership key that indicates that node 206 and node 210 are members of the set. However, node 214 may not be a member of the set. In such a case, a reputation client may examine the probabilistic set membership key for node 204 and determine that the reputation server does not have information about node 214. Because of that determination, the reputation client may infer the classification of node 214 from the inherited classifications of higher level nodes.

The probabilistic set membership key may identify membership of a URL in a specific set of URLs. In many cases, such a set may be the URLs that are one child generation from a given URL. For example, a probabilistic set membership key for node 204 may include the URLs of child nodes 206, 210, and 214, but not the node 208 which may be two generations removed from the node 204.

In other embodiments, the probabilistic set membership key may identify a set of URLs that include two, three, or more generations from a given node. Some embodiments may include all nodes in a domain, for example.

In some embodiments, a probabilistic set membership key may identify a set of URLs that includes nodes both parent and child nodes of a given node, and some may include multiple generations of parent and child nodes.

Figure 3:
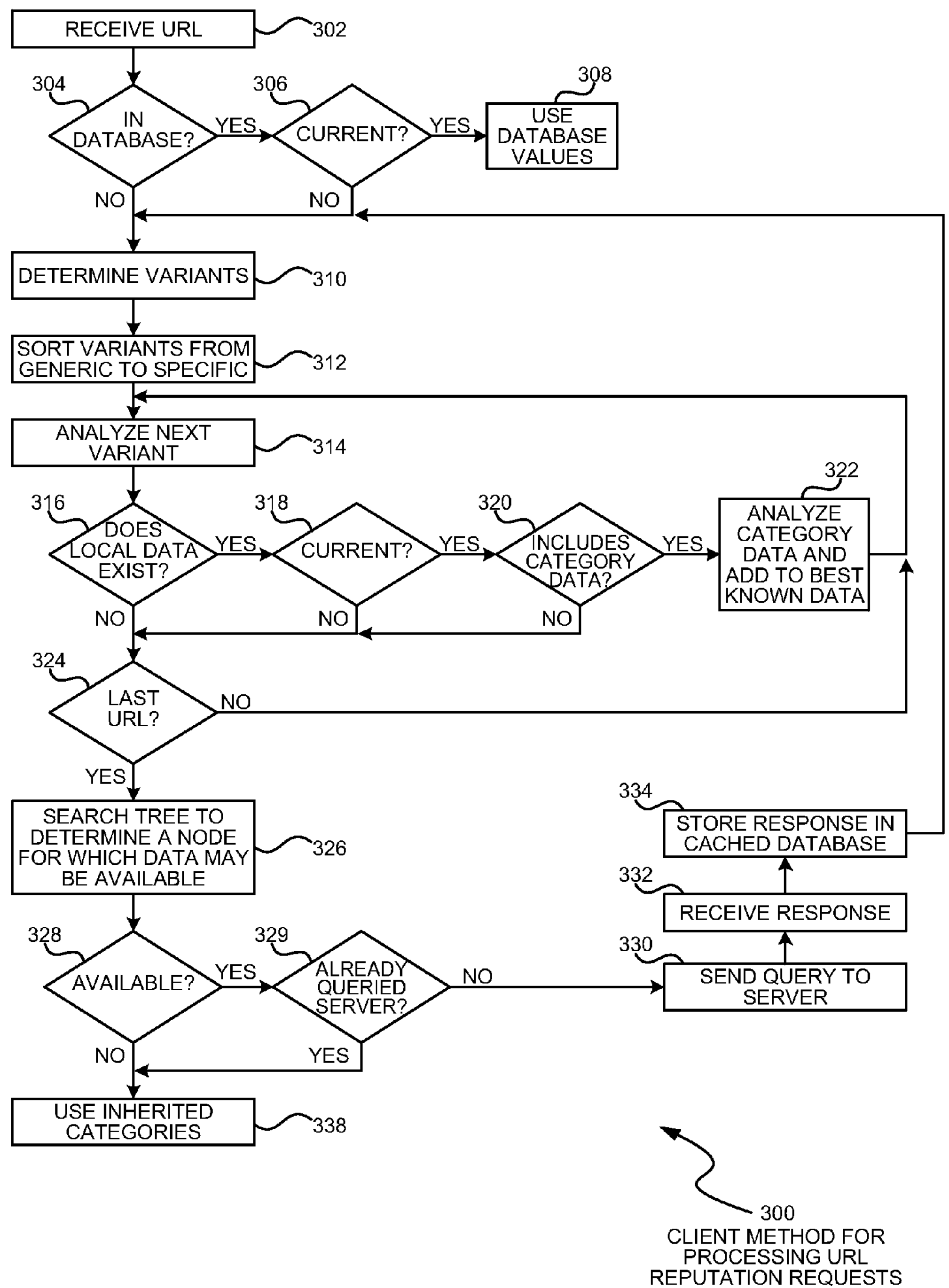
FIG. 3 is a flowchart illustration of an embodiment showing a method for processing URL reputation requests by a reputation client.

FIG. 3 is a flowchart illustration of an embodiment 300 showing a method for processing URL request by a reputation client. Embodiment 300 is an example of a method that may be performed by the URL reputation client 121 of embodiment 100, for example.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates merely one method by which a reputation client may determine a classification using a sparsely populated reputation database and probabilistic set membership keys. The reputation client may build a classification for a given URL from the inheritance of classes from higher level variants of the URL. When the URL is not found in the cached reputation database, but when the URL or a variant of the URL is possibly available from the reputation server, a query may be made to the server to fetch the classification and populate the cached reputation database.

A URL may be received in block 302. The URL may be transmitted to a URL reputation client from another application, service, gateway, firewall, or any other operation that may consume URL reputation information.

If the URL is in the cached database in block 304 and the data are current in block 306, the values found in the cached database in block 308.

In many embodiments, the data retrieved from a reputation server may be marked with a timestamp. The timestamp may indicate an expiration date for the data or may be the time the data are retrieved. The timestamp may be used to indicate when the data may be refreshed in the cached reputation database.

The data stored in the reputation database may go stale over a period of time. For example, some websites may be updated continually and such updates may cause the classification of the website or pages within the website to be changed or updated.

In some embodiments, a timestamp may indicate an expiration date for a record in the cached reputation database. In such embodiments, a reputation server may determine an expiration time for some URLs that is shorter than others. URLs that are updated infrequently may be given a long expiration time, while URLs that are updated frequently may be given a short expiration time. In some cases, a URL that is updated very frequently may be given no expiration time, which may cause a client to query the reputation at each request.

If the URL is not in the database in block 304 or not current in block 306, the reputation client may evaluate the URL to determine a classification from the available data, and may perform a query to the reputation server if data are available or no data are found in the database.

The reputation client may determine the variants of a URL in block 310. The variants may include host variants and path variants. In some cases, the variants may include combinations of host and path variants for any combination.

The variants may be sorted in order from most generic to most specific in block 312. The order may be used to determine inheritable classifications from higher level to lower level URLs.

The next variant may be analyzed in block 314. Each variant may be analyzed in order of increasing specificity. The first variant to be analyzed may be the highest level domain name from the list of variants.

If the local data does exist in block 316, the data are current in block 318, and category data are included in block 320, the category data may be analyzed in block 322 to establish the best known data. An example of the process performed by block 322 may be found in embodiment 400 presented later in this specification.

In some embodiments, data stored in the cached reputation database may not include classification data. In such cases, the data may include probabilistic set membership keys but not include classification data. Such cases may occur when the classification data may be inherited from a higher level URL.

If one of the conditions of blocks 316, 318, or 320 is not true, the process may return to block 314 to analyze another variant URL in block 324. This process may continue until all of the variants are analyzed.

After the variants are analyzed in block 324, the tree of URLs may be searched in block 326 to identify a node in which the probabilistic set membership keys may indicate that the requested URL or some variant may be available from the reputation server. An example of a process performed by block 326 may be found in embodiment 500 presented later in this specification.

If the additional information may be available in block 328 and a previous query has not been made in block 329, the query may be sent to the server in block 330 and the response received in block 332. The response may be stored in the cached reputation database in block 334 and the process may return to block 310 to analyze the cached reputation database with the updated information.

When a previous query has been made in block 329, this indicates that the reputation server may have transmitted all of the available information and that a further query may be unproductive. Thus, if a query has already been made in block 329 or when another mode is not available, the process may end in block 338 by using the best known reputation data generated in block 322.

The query in block 330 may include just the URL from block 302, while in other embodiments, the query in block 330 may include variants of the URL from block 302.

The results returned in block 332 may include the URL from block 302 as well as information for variants of the URL. In some cases, the results of block 332 may include URLs that may be anticipated or predicted by the reputation server for future queries, providing information regarding a superset of the variants defined in block 310. The superset may be used to populate the cached reputation database so that the reputation client may process anticipated URLs without having to query the reputation server.

Figure 4:
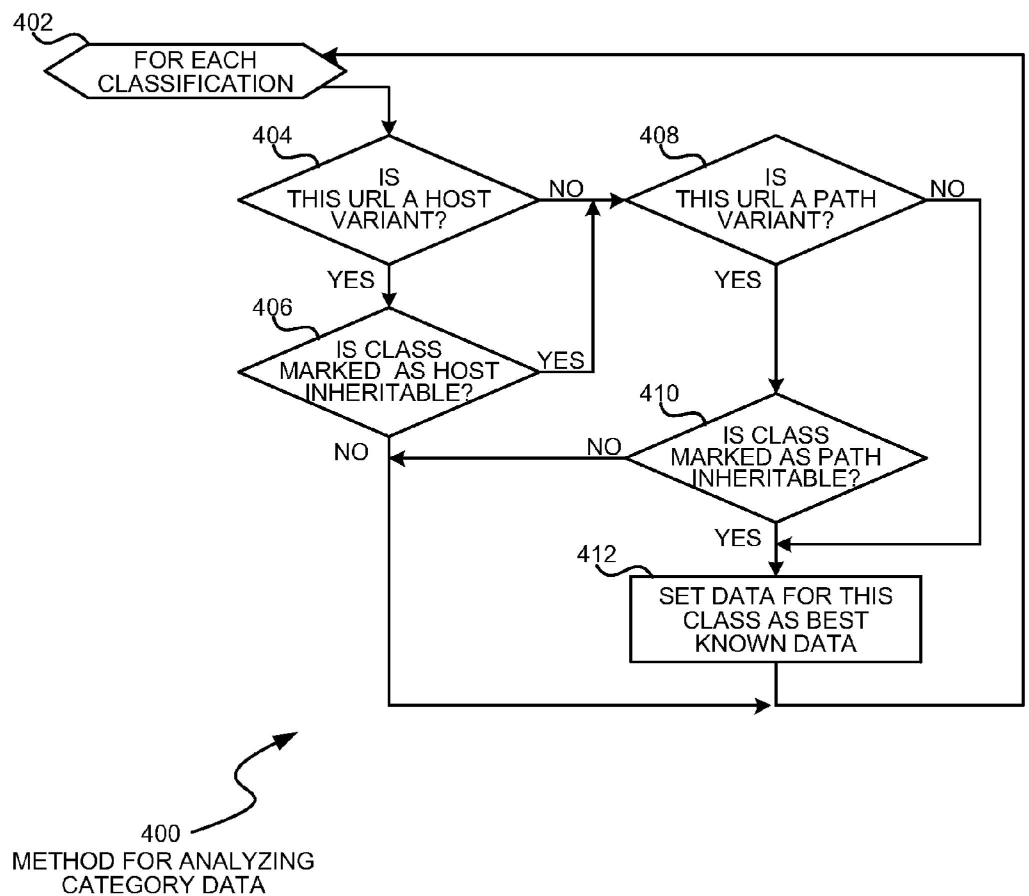
FIG. 4 is a flowchart illustration of an embodiment showing a method for analyzing category data.

FIG. 4 is a flowchart illustration of an embodiment 400 showing a method for analyzing category data. Embodiment 400 is an example of a method that may be performed for block 322 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method by which classifications may be analyzed for inheritance and applied. Embodiment 400 may generate a set of best known data that may by updated by successive executions of embodiment 400 by more specific URLs, as described in embodiment 300.

Each classification may be analyzed in block 402. In many embodiments, each URL may have multiple classifications, and each classification may be separately analyzed in block 402.

Embodiment 400 may perform analysis of a current URL variant in relation to a target URL. The target URL may be the end node for which a reputation classification may be requested, and the current URL may be the variant of the target URL. The current URL may be the URL selected in block 314 of embodiment 300.

If the current URL is a host variant of the target variant in block 404 and the class is not marked as host inheritable in block 406, the classification may be ignored and the process returns to block 402 to process another classification.

Similarly, if the current URL is not a host variant in block 404 but is a path variant in block 408, but the class is not marked as path inheritable in block 410, the classification may be ignored and the process returns to block 402 to process another classification.

If the current URL is a host variant in block 404 and the class is marked as host inheritable, or if the URL is marked as a path variant in block 408 and the class is marked as path inheritable in block 410, the class setting may be added to the classification as the best known data in block 412.

The process of embodiment 400 may be repeated with successively more specific URLs in embodiment 300, and the data of block 412 may be updated with inheritable classifications with each successive URL.

Figure 5:
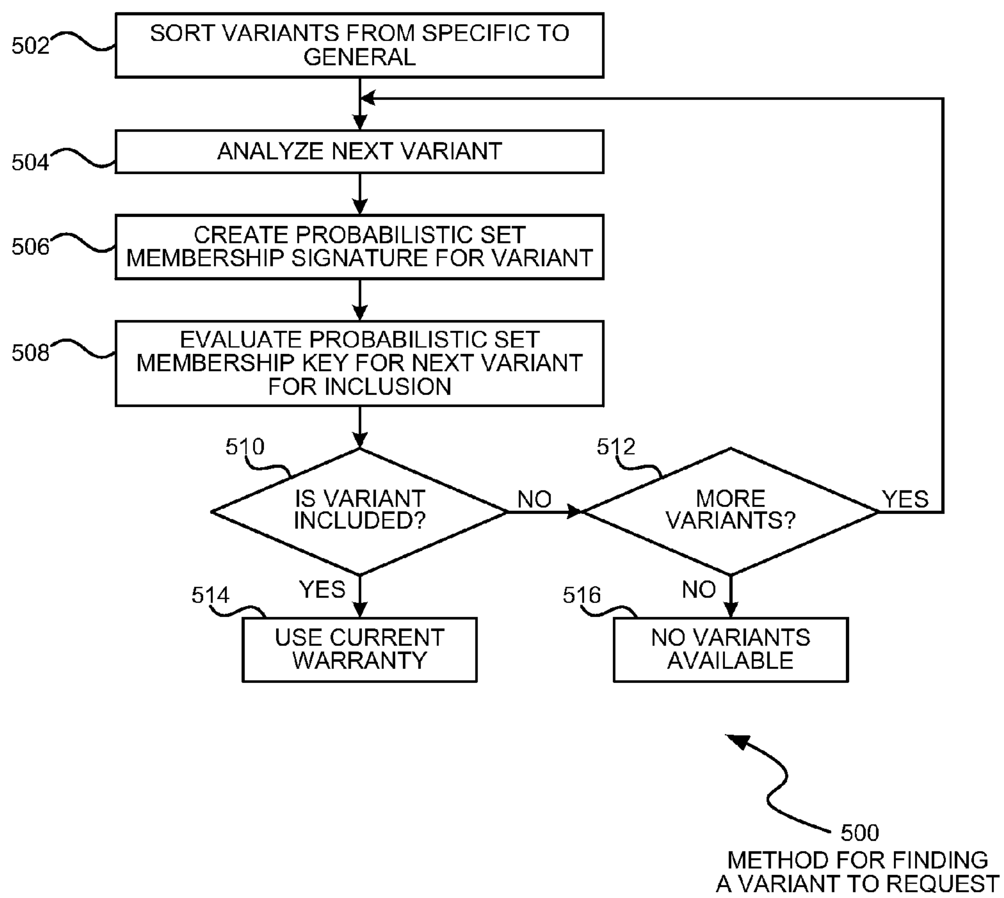
FIG. 5 is a flowchart illustration of an embodiment showing a method for finding a variant to request.

FIG. 5 is a flowchart illustration of an embodiment 500 showing a method for finding a variant to request from a reputation server. Embodiment 500 is an example of a method that may be performed for block 326 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is a method by which a tree of variants may be traversed to determine if a variant is included in the next variant's probabilistic set membership key.

The variants may be sorted from specific to general in block 502. The first of the variants may be analyzed in block 504.

A probabilistic set membership signature may be created for the variant in block 506. In the case of a Bloom filter, the URL may be processed by one, two, or more hash functions to generate a signature that is used in a Bloom filter.

In bock 508, the signature may be compared to the probabilistic set membership key of the next variant. If the variant is included in block 510, the current variant being analyzed may be selected in block 514. The variant selected in block 514 may be the variant transmitted to a reputation server in block 330 of embodiment 300.

If the variant is not included in block 510, and more variants exist in block 512, the process may return to block 504 to process the next variant. By returning to block 504, the process of embodiment 500 may traverse the tree of URLs upwardly to find a variant for which the reputation server may have information. Embodiment 500 will select the most specific variant if there are several variants that may have information available at the reputation server.

If all of the variants are processed in block 512 and no variant is included in the probabilistic set membership key in block 508, embodiment 500 may exit in block 516 with no variants available.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a uniform resource locator (URL) reputation client, said method being performed on a computer processor, said method comprising:

receiving a first URL as part of a request for a URL reputation, said request being sent from a client device;

determining that said first URL is not present in a cached reputation database;

determining a set of variants for said first URL;

determining that a first variant is stored within said cached reputation database, said first variant having a first classification;

determining that said first classification is inheritable;

analyzing said cached reputation database to determine that a reputation server does not contain classification information about said first URL, said cached reputation database comprising probabilistic set membership keys;

assigning said first classification to said first URL;

identifying a second URL;

analyzing said cached reputation database to determine that said second URL is included in one of said probabilistic set membership keys;

transmitting said second URL to a reputation server;

receiving a second classification, said second classification being defined for said second URL;

for each URL variant of a plurality of URL variants for said second URL, receiving a probabilistic set membership key; and storing said received probabilistic set membership key in said cached reputation database.

2. The method of claim 1, each probabilistic set membership key of said probabilistic set membership keys having an expiration setting.

3. The method of claim 1, further comprising:

determining said plurality of URL variants; and transmitting said plurality of URL variants to said reputation server.

4. The method of claim 1, said first classification comprising a first inheritance indicator.

5. The method of claim 4, said first inheritance indicator indicating that said reputation classification is inheritable by path variant.

6. The method of claim 4, said first inheritance indicator indicating that said reputation classification is inheritable by host variant.

7. The method of claim 1, said first classification comprising membership in a first class and a second class.

8. The method of claim 7, said first class having a first inheritance indicator and said second class having a second inheritance indicator.

9. The method of claim 8, said first class being inheritable by path variant, said second class being inheritable by host variant.

10. A uniform resource locator (URL) reputation server comprising:

a processor;

a network connection;

a cached reputation database;

said processor configured to:

receive a first URL as part of a request for a URL reputation, said request being sent from a client device;

determine that said first URL is not present in the cached reputation database;

determine a set of variants for said first URL;

determine that a first variant is stored within said cached reputation database, said first variant having a first classification;

determine said first classification is inheritable;

analyze said cached reputation database to determine that a reputation server does not contain classification information about said first URL, said cached reputation database comprising probabilistic set membership keys;

assign said first classification to said first URL;

identify a second URL;

analyze said cached reputation database to determine that said second URL is included in one of said probabilistic set membership keys;

transmit said second URL to a reputation server;

receive a second classification, said second classification being defined for said second URL;

for each URL variant of a plurality of URL variants for said second URL, receive a probabilistic set membership key; and store said received probabilistic set membership key in said cached reputation database.

11. The URL reputation server of claim 10 further comprising:

a web crawler; and a classification engine configured to determine a classification for a given URL and populate said cached reputation database with classification.

12. The URL reputation server of claim 10, said processor further configured to:

determine a plurality of variants for said first URL;

determine a probabilistic set membership key for each variant of said plurality of variants; and transmit said probabilistic set membership keys to said client device in response to said request.

13. The URL reputation server of claim 10, said probabilistic set membership key being determined for a single generation of addresses.

14. The URL reputation server of claim 10, said probabilistic set membership key being determined for a plurality of generations of addresses.

15. The URL reputation server of claim 10, said probabilistic set membership key having an expiration.

16. A uniform resource locator (URL) reputation client comprising:

a processor;

a network connection;

a cached URL reputation database comprising reputation information for a plurality of URL addresses having a common second level domain name, and for each URL address of said plurality of URL addresses, a probabilistic set membership key for lower level URL addresses, said probabilistic set membership key indicating availability of said lower level URL addresses in a URL reputation database available from a URL reputation server;

said processor configured to:

receive a first URL;

determine that said first URL is not present in said cached URL reputation database;

determine a first set of variants comprising variants for said first URL;

determine that a first variant is stored within said cached URL reputation database, said first variant having a first classification;

determine that said first classification is inheritable;

analyze said cached URL reputation database to determine that said reputation server does not contain classification information about said first URL, said cached URL reputation database comprising probabilistic set membership keys;

assign said first classification to said first URL;

receive a second URL;

determine that said second URL is not present in the cached URL reputation database;

determine a second set of variants comprising variants for said second URL;

determine that none of said second set of variants are stored within said cached URL reputation database;

transmit said second URL to said URL reputation server; and receive a second classification assigned to said second URL from said URL reputation server.

17. The URL reputation client of claim 16, said processor further configured to: transmit said second set of variants to said URL reputation server.

* * * * *